G. OLSON.
COMBINED CLUTCH, RELEASE, AND LOCKING DEVICE.
APPLICATION FILED JULY 16, 1914.
1,187,858.
Patented June 20, 1916.
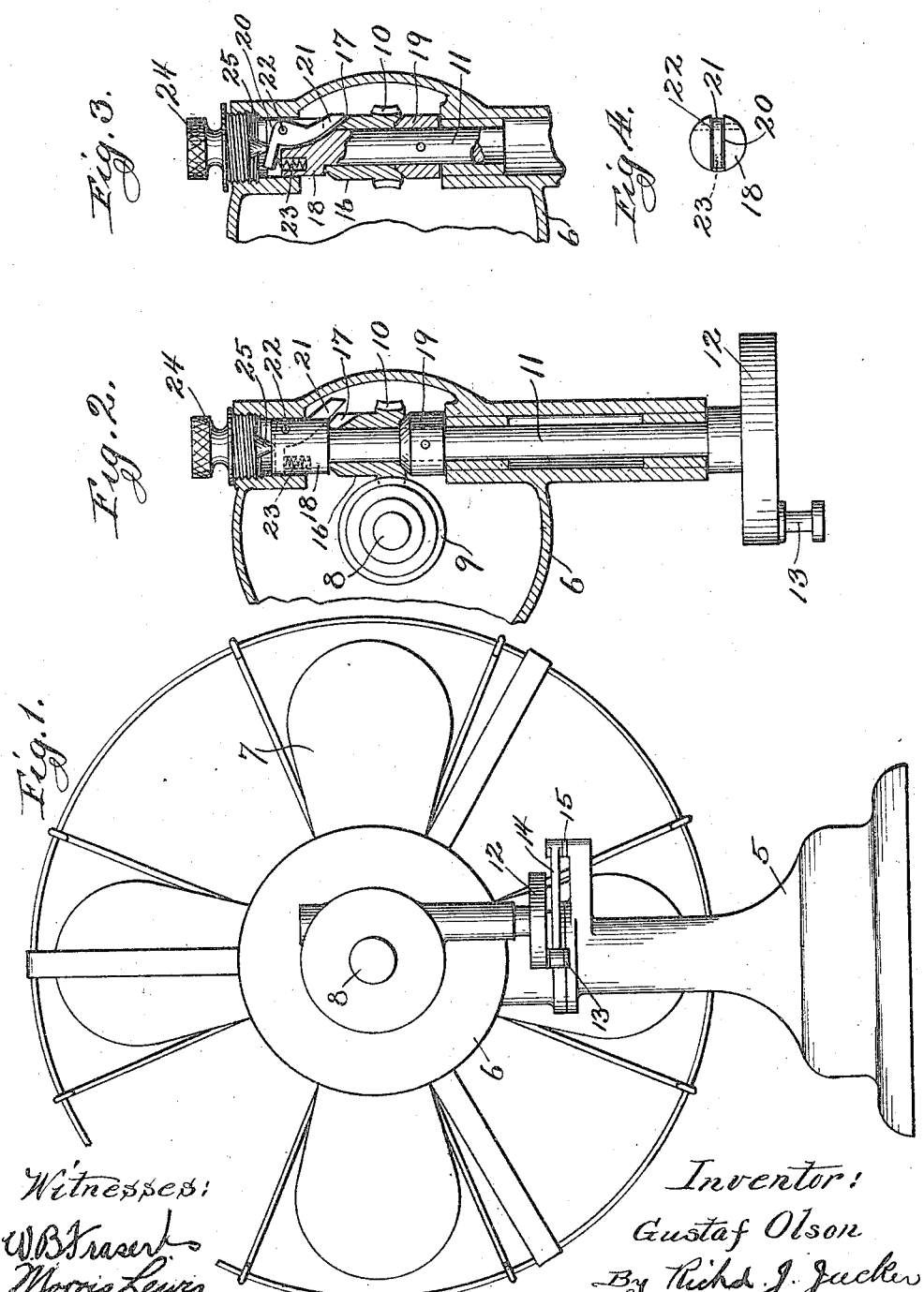
Witnesses:
W. B. Fraser
Morris Lewis
Inventor:
Gustaf Olson
By Richd. J. Jucker
Atty.
THE COLUMBIA PLANOGRAPH CO., WASHINGTON, D. C.

UNITED STATES PATENT OFFICE.

GUSTAF OLSON, OF CHICAGO, ILLINOIS, ASSIGNOR OF ONE-THIRD TO LOUIS GREENBERG AND ONE-THIRD TO WILLARD M. McEWEN, BOTH OF CHICAGO, ILLINOIS.

COMBINED CLUTCH, RELEASE, AND LOCKING DEVICE.

1,187,858.  Specification of Letters Patent.  Patented June 20, 1916.

Application filed July 16, 1914. Serial No. 851,415.

*To all whom it may concern:*

Be it known that I, GUSTAF OLSON, a citizen of the United States, residing at Chicago, in the county of Cook and State of Illinois, have invented a new and useful Combined Clutch, Release, and Locking Device, of which the following is a specification.

My invention relates to a combined device for clutching a driving member and a driven member together and for releasing the clutching device and locking the driven member against rotation, and the objects of my improvements are first, to effect the operation by simply manipulating a set screw or a small handle; second, to have the operating parts entirely covered and protected; third, to make a safe, swift, sure, simple, strong and durable device; fourth, to automatically release the driven member from its locked position when the clutch is closed and lock the same against movement when the clutch is opened or released; and other features to become apparent from the description to follow.

Heretofore the mechanism provided to connect and disconnect a driving member and a driven member has been clumsy and complicated, requiring laborious connecting or disconnecting of parts involving loss of time and danger of injury to the operator, or was uncertain in connection, permitting slipping; furthermore, the release of the operating members was of such construction that, to insure safety, the operating members had to be shut off or stopped, it was more or less complex, not readily operated and sometimes requiring some special tool to effect the release, this necessarily was undesirable and objectionable. These objectionable features are entirely eliminated by the use of my invention.

The device comprising my invention is particularly designed for use on electric fans which oscillate or have movements additional to the movement of the fan itself and which oscillatory or additional movement can be shut off while the fan itself is permitted to rotate.

The clutch and release in an electric fan is that operative connection which connects and disconnects the mechanism which moves, oscillates or turns the fan while the fan itself is revolving, the particular mechanism forming the subject matter of my invention being a new and novel combined clutch, clutch release and lock for the driven member, and is applicable to any mechanism where a connection and disconnection is made between a driving member and a driven member; and while I have shown and will describe the same in connection with an electric fan, it will be understood that it can be applied to other devices.

To describe my invention so that others versed in the art to which it pertains can make and use the same, I have illustrated it on the accompanying sheet of drawing forming a part of this specification and in which:—

Figure 1, is an elevation of an electric fan equipped with a combined clutch, release and locking device embodying my invention; Fig. 2, is a vertical sectional view partly in elevation on an enlarged scale showing the clutch released and the locking device in a locked position and adjacent parts; Fig. 3, is a similar view showing the clutch closed and the locking device in an unlocked position, and Fig. 4, is a detail plan view of a portion of the release.

Similar reference characters refer to similar parts throughout the several views:

The base 5 is of any ordinary construction upon which is pivotally mounted the revoluble frame 6 carrying the motor and fan 7 which is mounted in the usual way on the motor shaft 8. In the particular construction shown the motor shaft 8 has mounted on its end remote from the fan 7 a worm wheel 9 which is in constant mesh with a worm gear 10 mounted on a vertical shaft 11 which is mounted in suitable bearings in the frame 6. The parts described are preferably entirely concealed or covered in the dust tight frame 6, and only the lower end of shaft 11 protrudes outside the said frame 6, where it is provided with the disk 12, carrying the crank pin 13. A suitable link 14 connects the crank pin 13 with a pin 15 rigidly secured to the base 5 at a point eccentric of the axis of rotation of the frame 6, so that as the disk 12 and shaft 11 are rotated by the action of the motor shaft 8, the frame 6, and of course the fan 7 also, will be oscillated about the vertical pivot forming the connection between the base 5 and the frame 6. This oscillatory motion of the frame 6 may be acquired by other construction than that shown and described without departing from the scope of my invention.

The worm gear 10 is loosely mounted on the shaft 11 and is provided with an upwardly extending hub 16 which is provided with a radial slot 17 in its upper end. The shaft 11 is provided at its upper end with an enlarged head 18 against the lower side of which the hub 16 bears, and a bearing collar 19 is rigidly secured to the shaft 11 immediately below the worm gear 10, so that said gear is held against longitudinal movement on shaft 11 by the head 18 and the collar 19.

The head 18 is provided with a slot 20 extending diametrically across its top and down on one side where its lower open end is arranged to register with the slot 17 in gear hub 16 when the latter is in the proper position of rotation. A locking pawl 21 is mounted in the slot 20 and is pivoted to swing about the pin 22 so that its lower and longer end extends beyond the lower side of the head 18 and its shorter end extends horizontally in the upper part of slot 20. The pivotal pin 22 is to one side of the axial line of shaft 11 and on the opposite side of said axial line a small expanding coiled spring 23 is provided underneath the short end of pawl 21 in a suitable hole provided therefor in head 18, so that the lower longer end of the pawl is constantly yieldingly held against the upper end of the hub 16. As the motor shaft 8 rotates it will rotate the worm gear 10 and of course also the hub 16, and if the pawl 21 is out of the slot 17 in hub 16, it will be forced into the same by spring 23 as soon as it registers with same. When the lower end of the pawl 21 is in the slot 17 of the hub 16, the worm gear 10 and the shaft 11 are locked together and rotate in unison, and when the lower end of the pawl 21 is out of engagement with the slot 17 of hub 16, the worm gear 10 and the shaft 11 are unlocked, and the said worm gear 10 rotates idly on said shaft 11. Thus it is clear that the gear 10 and shaft 11 are locked together when the lower long end of pawl 21 is in the slot 17, and that the gear 10 is released from shaft 11 when the lower long end of pawl 21 is withdrawn from the slot 17, so that to control the connection between worm gear 10 and shaft 11, it is only necessary to swing the locking pawl 21 about its pivot 22 into either one or the other of its two positions. It will be noted that the spring 23 always tends to move the locking pawl into its locked position, i. e., with its lower end in the slot 17 of hub 16.

In the position shown in Fig. 2, the locking pawl 21 is in its unlocked or released position and in Fig. 3, it is shown in its locked position, thus it is seen that it is only necessary to slightly depress the short horizontal end of said pawl against the pressure exerted by spring 23 to move it from its locked position to its released position. To thus move the locking pawl 21 from its locked position to its released position any desired mechanism may be employed, but I preferably arrange a thumb screw 24 concentrically above the shaft 11 which is provided with a reduced lower end 25 sufficiently small to enter the slot 20 in head 18 and contact with the short horizontal end of the pawl 21, so that to release the pawl 21, the thumb screw is turned to move downward and to lock said pawl, the thumb screw 24 is turned to move upward.

The thumb screw 24 of course has its hand piece extending outside the frame 6 into which it is threaded so that the release mechanism can easily be manipulated while the fan is in operation, and all the operating parts are concealed.

The driving shaft 8, it will be noted, may be revolving continuously while the locking pawl 21 is moved into and out of clutch with the gear hub 16, and when the locking pawl 21 is out of clutch with the gear 10, the shaft 11 and the parts which are operatively connected thereto might, by force of gravity or other cause, be moved from its desired position if it were not held against movement. To thus lock the shaft 11 against movement when it is operatively disconnected from the shaft 8, I arrange the parts so that a portion of the locking pawl 21 will contact with the frame 6 as soon as its extremity is withdrawn from slot 17 in hub 16. Thus when the thumb screw 24 is turned to move downward as viewed in Fig. 2, the free end of the locking pawl 21 is moved out of slot 17 in hub 16, and a portion of same. nearer the pivot 22, is brought into contact with frame 6, and the frictional contact between said locking pawl and said frame is sufficient to lock the shaft 11 against movement.

It will be understood that the size, arrangement and construction of the several parts comprised by my invention can be modified without in the least departing from the scope of my invention.

Having thus fully described my invention what I claim as new and desire to secure by Letters Patent of the United States is:—

1. In a device of the character described, a driving shaft and a driven shaft, a rotative member loosely mounted on one of said shafts and having power-transmitting connection with the other of said shafts, a locking member rockably carried by the shaft upon which said rotative member is mounted and adapted when rocked in one direction to engage said rotative member and lock the same to the shaft upon which it is mounted, and when rocked in the opposite direction to become disengaged from said rotative member and unlock the same from the shaft upon which it is mounted, and means for rocking said locking member in either direction.

2. In a device of the character described, a driving shaft and a driven shaft, a rotative member loosely mounted on one of said shafts and having power-transmitting connection with the other of said shafts, a locking member pivotally secured to the shaft upon which said rotative member is mounted and adapted when moved in one direction to engage said rotative member and lock the same to the shaft upon which it is mounted, and when moved in the opposite direction to become disengaged from said rotative member and unlock the same from said shaft upon which it is mounted, a spring for moving said locking member in one direction, and means for positively moving said locking member in the opposite direction.

3. In a device of the character described, a driving shaft and a driven shaft, a rotative member loosely mounted on one of said shafts and having power-transmitting connection with the other of said shafts; the shaft upon which said rotative member is mounted being provided with a recess, a spring-pressed locking member pivotally mounted in said recess and adapted when moved in one direction to engage said rotative member and lock the same to the shaft upon which it is mounted, and when moved in the opposite direction to become disengaged from said rotative member and unlock the same from the shaft upon which it is mounted, and a member for moving said locking member in a direction against the pressure exerted by said spring.

4. In a device of the character described, a driving shaft and a driven shaft, a rotative member loosely mounted on one of said shafts and having power-transmitting connection with the other of said shafts, said rotative member being provided with a slot, a spring-pressed locking member pivotally connected with the shaft upon which said rotative member is mounted and adapted when moved in one direction to enter said slot and lock the rotative member to the shaft upon which it is mounted and when moved in the opposite direction to become disengaged from said slot and unlock said rotative member from the shaft upon which it is mounted, and means for moving said locking member against the pressure exerted by said spring.

5. In a device of the class described, a driving shaft, a driven shaft, a gear rigidly mounted on said driving shaft, a gear loosely mounted on said driven shaft in constant mesh with said first named gear, a locking pawl arranged to lock the second named gear to the driven shaft pivotally mounted on the driven shaft and provided with a lower locking end and an upper horizontal end, said upper horizontal end lying in the axial line of the driven shaft, and means for swinging the locking pawl on its pivot.

6. In a device of the class described, a shaft, a driving member loosely mounted on said shaft, a locking member partly in the axial line of said shaft to lock the shaft to the driving member and a screw concentric with the shaft for moving said locking member.

7. In a device of the class described, a suitable frame, a shaft rotatably mounted in said frame, a driving member loosely mounted on said shaft, a locking member partly in the axial line of said shaft arranged to be in either of two positions, one to lock the shaft and driving member together and the other to unlock the shaft from the driving member and lock the shaft to the frame, and a screw concentric to the shaft for moving said locking member.

8. In a device of the class described, a shaft, a driving member loosely mounted on said shaft, a locking pawl pivotally mounted on said shaft provided with a lower end outside the axial line of the shaft and with an upper horizontal end in the axial line of the shaft and a screw concentric to the shaft for swinging the locking pawl on its pivot.

9. In a device of the class described, a frame, a shaft rotatably mounted in said frame, a driving member loosely mounted on said shaft, a locking pawl pivotally mounted on said shaft partly in the axial line of said shaft and arranged to be in either of two positions, one to lock the shaft and driving member together and the other to unlock the shaft from the driving member and lock the shaft to said frame and a screw concentric to said shaft for swinging said locking pawl on its pivot.

In testimony wheerof I have signed my name to this specification in presence of two subscribing witnesses this 11th day of July 1914, at Chicago, Illinois.

GUSTAF OLSON.

Witnesses:
  LOUIS GREENBERG,
  LILLIE SALZER.